Patented Jan. 19, 1954

2,666,772

UNITED STATES PATENT OFFICE 2,666,772

POLYMERIC TITANIUM ESTER ANHYDRIDES

Thomas Boyd, Springfield, Mass., assignor to Monsanto Chemical Company, St. Louis, Mo., a corporation of Delaware No Drawing. Application January 27, 1951, Serial No. 208,240

3 Claims. (Cl. 260—414)

This invention relates to condensation polymers of derivatives of orthotitanic acid. More particularly the invention relates to a method for preparing polymeric mixed anhydrides of orthotitanic acid and organic acids from condensation polymers of esters of orthotitanic acid and to the mixed ester anhydrides which may be obtained as intermediates in the reaction.

The condensation polymers of esters of orthotitanic acid are new materials which are disclosed and claimed in my copending application Serial No. 122,844, filed October 21, 1949. They are prepared by reacting one or more monomeric esters of orthotitanic acid with controlled amounts of water under otherwise anhydrous conditions. In the same application, are disclosed the condensation polymers of mixed anhydrides of orthotitanic acid and organic acids prepared by an analogous process, i. e., condensation polymerization by means of the controlled addition of water to the monomers under otherwise anhydrous conditions.

One object of this invention is to provide a new process for making polymeric mixed anhydrides of orthotitanic acid and organic acids.

A further object is to provide polymeric orthotitanic acid derivatives in which part of the substituents are ester groups and part of the substituents are organic acid anhydride groups.

Another object is to provide a process for preparing polymeric derivatives of orthotitanic acid in which part of the substituents are ester groups and the remainder are organic acid anhydride groups.

These and other objects are attained by reacting a substantially straight chain condensation polymer of a tetra-ester of orthotitanic acid with a carboxylic acid under anhydrous conditions and in the absence of catalysts.

The following examples are given in illustration and are not intended as limitations of the scope of this invention.

EXAMPLE I

A dimer of tetrabutyl orthotitanate was prepared by reacting one mol of the monomer with 0.5 mol of water under otherwise anhydrous conditions as set forth in copending application S. N. 122,844. One mol of the dimer was then mixed with 6 mols of stearic acid. The mixture was heated gently until the acid melted. The reaction temperature was then gradually raised to about 210° C. accompanied by a gradual reduction in pressure to about 1 mm. of mercury. The system was maintained at 210° C. and 1 mm. of mercury for about 10 minutes. During the reaction 6 mols of butanol distilled from the reaction mixture. On cooling of the reaction vessel and opening it to atmospheric pressure, a yellowish wax-like solid was obtained. It was soluble in toluene, xylene and alcohols. When applied to cotton fabric from xylene solution, it rendered the fabric water-repellent.

EXAMPLE II

Example I was repeated except that the amount of stearic acid was reduced to 5 mols. Only 5 mols of butanol were recovered and the product, though similar to that of Example I, was slightly softer.

When the process of Examples I and II was repeated using successively smaller proportions of stearic acid, a series of products were obtained which became softer as the amount of stearic acid was decreased. In each case the amount of butanol recovered was equivalent on a molar basis to the amount of stearic acid used.

EXAMPLE III

One mol of a dimer of tetrabutyl orthotitanate was mixed with 4 mols of decanoic acid. The mixture was heated gently until it became homogeneous and then the temperature was raised slowly to about 175° C. accompanied by a gradual reduction of the pressure to about 0.5 mm. of mercury. Four mols of butanol were recovered. The product was a clear viscous liquid having a slight yellow color. It was soluble in toluene, xylene and various alcohols. When applied to fabrics, it rendered them water-repellent but imparted to them a slightly harsher hand than did the product of Example I.

EXAMPLE IV

One mol of a pentamer of tetra-ethyl orthotitanate was dissolved in toluene. Six mols of stearic acid were added to the solution. The solution was heated at reflux temperature at atmospheric pressure for about 10 minutes and then the temperature was raised to about 150° C. and the pressure was reduced to about 1 mm. of mercury to remove the solvent and recover the ethanol released by the reaction. The product was a soft waxy material having excellent properties as a water-repellent lubricant for glass fibers.

EXAMPLE V

One mol of a tetramer of tetra 2-ethyl hexyl orthotitanate was reacted with 4 mols of oleic acid. The reaction was carried out by first fusing the two components at a relatively low temperature followed by gradually raising the temperature to 200° C. and decreasing the pressure to 1 mm. of mercury. Four mols of 2-ethyl hexanol were recovered. The product was a soft waxy material which was compatible with various synthetic resins.

EXAMPLE VI

One mol of a pentamer of tetrabutyl orthotitanate was dissolved in butanol and 12 mols of butyric acid were added to the solution. The solution was then heated at reflux temperature and atmospheric pressure for about 15 minutes. The temperature was then slowly raised to about 210° C. and the pressure was decreased to about 0.5 mm. of mercury. During the temperature increase, the butanol used as the solvent and freed in the reaction was distilled off. The product was a pentamer of a tetra-anhydride of orthotitanic acid and butyric acid. It was a clear soft gel.

EXAMPLE VII

A trimer of a tetra-anhydride of orthotitanic acid and phthalic acid was obtained by reacting one mol of a trimer of tetrabutyl orthotitanate with 8 mols of phthalic acid. The reaction was started by fusing the two components and then the temperature was raised and the pressure reduced to recover the butanol released by the reaction. The product was a white waxy solid.

The condensation polymers which are the starting point of the process of this invention are polymers prepared from tetraesters of orthotitanic acid by reacting the monomer with from 0.5 to 1.0 mol of water per mol of monomer under otherwise anhydrous conditions. Careful control of the amount of water provides an accurate control of the degree of polymerization. The degree of polymerization approaches infinity asymptotically as the amount of water approaches 1 mol per mol of monomer. However, if more than one mol of water is used, the polymer immediately begins to crosslink and insoluble, infusible products are soon formed. The condensation polymers of this invention are the straight chain polymers made with up to 1 mol of water per mol of monomer.

The ester groups of the condensation polymers of this invention may be derived from any organic alcohol whether saturated or unsaturated, aliphatic or aromatic, cyclic or acyclic. If the ester groups contain ethylenic or acetylenic unsaturation, care must be taken to prevent the addition polymerization of the compounds through these unsaturated groups. This may be accomplished by the use of inhibitors for addition polymerization, such as catechols, hydroquinone, etc. For practical reasons, it is preferred to use ester groups derived from saturated aliphatic alcohols containing from 1 to 8 carbon atoms since these alcohols can be more easily removed from the reaction mixture in the distillation step. Among the preferred esters are the methyl, ethyl, propyl, butyl, amyl, hexyl, heptyl and octyl esters of orthotitanic acid. Other esters which may be used are the various isomeric butyl, amyl, hexyl, heptyl, octyl, toluyl, phenyl, cresyl, xylenyl, phenethyl, naphthyl, allyl, methallyl, crotonyl, cyclohexyl, propargyl, etc. esters.

Any carboxylic acid may be used including substituted or unsubstituted, saturated or unsaturated aliphatic or aromatic acids, or the anhydrides thereof. Among the acids which may be used are acetic, propionic, butyric, valeric, octanoic, decanoic, lauric, stearic, myristic, acrylic, methacrylic, decenic, oleic, adipic, succinic, suberic, maleic, atropic, cinnamic, phthalic, naphthalic, etc. acids. Each acid will impart a different property to the final product so that a wide variety of materials may be obtained having a diversity of uses. Moreover the amount of acid used will also affect the properties of the final product. The amount of acid may be varied from 1 to 5 or more mols per mol of polymer depending on the degree of polymerization of the latter. Theoretically the maximum amount of acid which may be used to obtain the products of this invention is $2n+1$ where $n$ is the degree of polymerization of the polymer. However, when $n$ is more than 3, the desired effects are usually obtained by employing somewhat less than the possible maximum.

The reaction between the polymer and the acid must be carried out under anhydrous conditions. It is spontaneous at temperatures as low as room temperature but generally comes to an equilibrium point short of complete reaction of the acid, until the alcohol released by the reaction is removed. Therefore, it is advantageous to raise the temperature of the reaction mixture gradually, accompanied by a slow reduction in pressure, to cause the reaction to go to completion as the alcohol is removed. The last of the alcohol is removed by a short distillation at temperatures ranging from 150° C. to 300° C. and at pressures of the order of from 0.1 to 10 mm. of mercury. No catalyst is necessary to accelerate the reaction.

Since many of the condensation polymers are either extremely viscous liquids or solids, it is often desirable to carry out the reaction in an inert anhydrous solvent. Such solvents as anhydrous alcohols, xylene, benzene, toluene, carbon tetrachloride, chloroform, ethyl ether, diphenyl ether, mineral spirits, etc. may be used. These solvents have the advantage that they are relatively low boiling and may be removed easily from the reaction product. Higher boiling solvents may be used if desired.

The mixed ester anhydride polymers in which the ester groups contain from 1 to 8 carbon atoms and the anhydride groups containing from 9 to 40 carbon atoms are particularly advantageous. The ester groups serve to maintain the solubility of the product in organic solvents and the anhydride groups serve to provide lubricating and water-repellent properties. The mixed ester anhydride condensation polymers are either viscous liquids or waxy solids. The great majority of them are soluble in organic solvents such as toluene, xylene, benzene, mineral spirits, etc. They vary from a light yellow to a deep straw in color.

The products of this invention are valuable as components in surface coating compositions, as water-repellent sizes for textiles and fabrics, accelerators for the cure of various thermosetting resins, wet strength improvers for paper and fibrous mats, lubricating sizes for mineral and glass fibers, etc.

It is obvious that variations may be made in the products and process of this invention without departing from the spirit and scope thereof as defined in the appended claims.

What is claimed is:

1. A process which comprises reacting, under anhydrous conditions, a straight chain condensation polymer of an organic ester of orthotitanic acid having the formula:

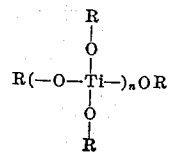

wherein the OR radicals are ester groups which are members of the class consisting of alkoxy, aryloxy and arylalkoxy groups and $n$ is an integer greater than 1, with a carboxylic acid having the formula:

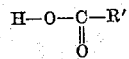

wherein R' is a radical taken from the group consisting of alkyl, alkenyl, aryl and aralkyl radicals, followed by removal of by-products of the reaction by distillation at elevated temperatures and sub-atmospheric pressures.

2. A process as in claim 1 wherein the condensation polymer of orthotitanic acid is a polymer of tetrabutyl orthotitanate.

3. A process as in claim 2 wherein the carboxylic acid is stearic acid.

THOMAS BOYD.

References Cited in the file of this patent

UNITED STATES PATENTS

| Number | Name | Date |
| --- | --- | --- |
| 2,489,651 | Langkammerer | Nov. 29, 1949 |
| 2,621,193 | Langkammerer | Dec. 9, 1952 |